United States Patent

Tirabassi

[15] 3,674,251

[45] July 4, 1972

[54] SELF-RESTORING ENERGY ABSORBING STOP

[72] Inventor: Benjamin John Tirabassi, Westwood, N.J.
[73] Assignee: The Bendix Corporation
[22] Filed: May 27, 1970
[21] Appl. No.: 41,234

Related U.S. Application Data

[62] Division of Ser. No. 792,675, Jan. 21, 1969, Pat. No. 3,582,081.

[52] U.S. Cl. ............................................. 267/162, 267/164
[51] Int. Cl. ........................................................... F16k 1/32
[58] Field of Search .................. 267/162, 164, 182, 121, 135, 267/31

[56] References Cited

UNITED STATES PATENTS 2,587,016    2/1952    Watts ..................................... 267/162

Primary Examiner—James B. Marbert
Attorney—Herbert L. Davis and Plante, Hartz, Smith and Thompson

[57] ABSTRACT

A self-restoring energy absorbing stop in a free pendulous magnetic azimuth detector mechanism in which the resilient stop serves to limit the motion of the free pendulous mechanism and includes a novel means of providing a viscous damping and rapid spring return in a low volume, high energy absorbing package.

3 Claims, 8 Drawing Figures

INVENTOR.
BENJAMIN J. TIRABASSI

INVENTOR.
BENJAMIN J. TIRABASSI
BY Herbert L. Davis
ATTORNEY

SELF-RESTORING ENERGY ABSORBING STOP

CROSS REFERENCE TO RELATED APPLICATIONS

The present application is a divisional of U.S. Application 792,675, filed January 21, 1969, now U.S. Pat. No. 3,582,081 issued June 1, 1971 to Benjamin J. Tirabassi and assigned to The Bendix Corporation, assignee of the present invention.

BACKGROUND OF THE INVENTION

1. Field of the Invention

This invention relates to a field of self-restoring energy absorbing stops and more particularly to an energy-absorbing assembly of an all metal construction including a sandwich of adjacent flat and wave spring metal elements immersed in a damping liquid medium in an associated relation such that under force a desired cushioning effect is produced by the damping fluid being forced out between the adjacent metal flat and wave spring elements as well as by a spring action effect of the wave spring elements.

2. Prior Art of the Invention

Heretofore there have been provided cushioning devices of a type such as disclosed in a U.S. Pat. No. 2,551,505 granted May 1, 1951 to Raymond G. Olson, Jr. in which the cushioning device includes a stacked formation of metal discs and alternate rubber members to produce a desired cushion effect as applied, for example, to heavy operative equipment such as a shock strut of the landing gear of an airplane, the recoil absorber for guns; or a resilient support for heavy engine equipment.

In the device of the aforenoted patent, the resilient rubber inserts or spacers of the cushioning device provide a diametrically opposite concept from the damping liquid medium of the present invention as applied to highly sensitive aircraft flight condition responsive equipment.

There is no suggestion in the patent of an energy-absorbing assembly being immersed in a damping liquid medium, as in the present invention, so that under impact or steady force the damping liquid may be forced out from between adjacent surfaces of the metal spring elements to provide the desired energy absorbing effect and in which arrangement of the present invention as the force is removed the spring assembly is self-restoring to its original position and shape, as the surrounding damping liquid is drawn in to fill the void between the adjacent surfaces of the wavy and flat spring elements.

Moreover the all metal construction of the sandwich assembly of flat and wavy spring elements of the present invention undoubtedly makes the device useable in a range of hostile environments, temperatures and damping liquids, which could not be tolerated by a device employing rubber or many other resilient materials as in the device of the cited patent. Moreover, the fact that the parts of the all metal sandwich of flat and wavy spring elements of the present invention does not require bonding eliminates assembly steps and thereby lowers the cost of the construction of an energy absorbing stop of the present invention as compared to the construction costs of the cushioning device of the aforenoted patent.

The device of the present invention is of that class of worthy and sustainable inventions where by adding a new idea and a new feature in assembling older features in a given mechanism an improved result is reached with less expense.

Moreover, the present invention rests in a conception which simplifies the mechanism of the cushioning device disclosed in the aforenoted patent and reduces the number of parts, in that the resilient rubber inserts or spacers of such cushioning device which while well adapted for use in heavy operative equipment have been omitted in the improved all metal assemblage of the present invention, as applied to the unrelated problems of an energy absorbing stop for highly sensitive aircraft flight condition responsive equipment, and by the provision of an improved all metal assemblage of a sandwich of flat and wavy metal spring members there is provided an energy absorbing stop which is entirely immersed in a damping liquid medium of the condition responsive equipment in such an associated relation that under force, the desired cushioning effect is produced through the action of the damping fluid in tending to dampen the movement of the spring members, while at the same time the arrangement of the present invention is such as to raise the per cent of durability and certainty of operation of the spring members of the energy absorbing stop so as to effect a condition of greater durability and one which is more sure to produce the desired result in emergency and not only with greater certainty but with less expense.

The present invention relates to a shock absorbing means applicable to a pendulous magnetic azimuth detector mechanism or electromagnetic device which may sense the strength of the magnetic field of the earth. The sensor device may be of a conventional three legged core and coil assembly type suspended on bearings of a gimbal structure so that the assembly may be maintained level during pitch and roll of an aircraft carrying the device in flight. The sensor device then may effectively transmit electrical signals corresponding to a difference in heading of the aircraft from a prealigned magnetic north.

The conventional sensor assembly may include a weighted element so arranged as to provide a pendulous action on the sensor device suspended on the bearings of the gimbal structure to maintain the sensor device level by the action of gravity while the complete assembly is immersed in a suitable viscous damping fluid to dampen oscillations of the sensor device.

The operating conditions of future aircraft call for rougher vibrational flight conditions than that in which the current units have been required to operate, while the extremely high speeds of such aircraft in flight may cause accelerational forces to deflect the weighted element of the pendulum with such force as to damage the sensor unit.

A problem arises then under such extreme vibrational operating conditions and flight maneuvers of the aircraft carrying the magnetic detector mechanism in that the gimbal-sensor-pendulous assembly of the prior art type devices may strike against limit stops causing damage to the bearings of the gimbals in which the sensor device may be suspended by the pendulous action of the weighted element as well as to the internal wiring of the highly sensitive earth magnetic field sensing electromagnetic device suspended in the gimbal bearings and thereby impair the operational accuracy as well as reduce the operating life of such pendulous magnetic azimuth detector mechanism.

The present invention resides in a recognition that in such a free pendulous magnetic azimuth detector mechanism it is desirable to limit angular movement of the detector mechanism by a shock absorbing means, and that while a cushioning device of a type such as disclosed in the Olson U.S. Pat. No. 2,551,505 including a combination spring and shock absorber assembly, together with resilient rubber inserts or spacers may be applicable to heavy operative equipment, such a cushioning device would require too great a displacement volume and would not provide a compact shock absorber assemblage having the immediate recoverability characteristics of the present invention so needed in a highly sensitive magnetic azimuth detector mechanism responsive to flight conditions of an aircraft; and in the further concept of an idea of means for the implementation of a compact energy absorbing stop assembly having complete recoverability under the high frequency impact operating conditions encountered in such a free pendulous mechanism by the provision in a damping liquid for the azimuth detector mechanism of a sandwich assembly of wavy and flat metal spring members which are totally immersed in the damping liquid so that the damping liquid may be forced between and intermediate the respective spring members to provide the desire damping action under applied impact forces, while the displacement volume of the energy absorbing stop may be substantially reduced to that of the compact assemblage of flat and wavy spring member having the required immediate recoverability characteristics.

The cushioning device of the aforenoted patent fails to suggest the simplified arrangement of the present invention, particularly in the provision of the sandwich of flat and wavy spring members immersed in a damping liquid medium so that as the energy absorbing assembly is compressed under impact or steady force, the wavy spring members are compressed and straightened between the flat spring members causing the damping liquid in which the assembly is immersed to be forced out from between adjacent surfaces of the flat and wavy spring members in an action in which the movement of the damping liquid from between the respective spring members provides the desired damping effect which may be controlled by varying (1) the wetted surface area of the flat and wavy spring members, (2) the viscosity of the damping liquid, and (3) the obstruction to the passage of the damping liquid from between the wavy and flat spring members, while as the applied force is removed the spring assembly is self-restoring to its original position and shape in an action in which the surrounding damping liquid is drawn in between the respective spring members to fill the void between the several spring members formed by the resulting restoration in the shape and operative relation of the respective spring members to effect a rapid rate of recoverability of the respective spring members to the preceding operative condition to thereupon permit an immediate reapplication of the impact forces while preserving all of the preceding damping characteristics available in the system so that relatively high frequency recoverability is obtainable depending on the particular configuration and operative association of the sandwich type spring assembly and damping liquid.

SUMMARY OF THE INVENTION

The present invention relates to a simplified means for effecting a self restoring energy absorbing stop, including novel means of incorporating viscous damping and rapid spring return in a low volume compact package assemblage with high energy absorbing characteristics.

An object of the invention is to provide a resilient energy absorbing stop, particularly adapted to limit the motion of a free pendulous mechanism, including a compact sandwich type assemblage of flat and wavy spring elements immersed in a viscous damping liquid medium to provide complete recoverability under high frequency impact and incorporating the damping liquid medium integrally with the spring elements and intermediate thereto so as to reduce the displacement volume of the sandwich assembly to that of the compact spring assemblage as well as reduce oscillations of the free pendulous mechanism immersed in the damping liquid.

Another object of the invention is to provide in such a free pendulous electromagnetic azimuth detector mechanism applied to an aircraft, a compact sandwich type assemblage of annular shaped flat and wavy spring washers arranged in concentric relation to the free pendulous mechanism so as to limit angular motion of the pendulous mechanism about perpendicular pitch and bank axes of the aircraft.

Another object of the invention is to provide an improved energy absorbing assembly including a sandwich of flat and wavy spring elements immersed in a damping liquid medium. The dimensions of which spring elements may be so selected as to obtain a predetermined spring rate and effective damping action while the outlined configuration of the assembly may be dependent on the applied use thereof so that a straight rectangular package, a curved package or an annular package of flat and wavy spring washers may be utilized in a particular application to provide a compact energy absorbing stop having a rapid rate of recoverability.

These and other objects and features of the invention are pointed out in the following description in terms of the embodiments thereof which are shown in the accompanied drawings.

DESCRIPTION OF THE INVENTION

Figure 1:
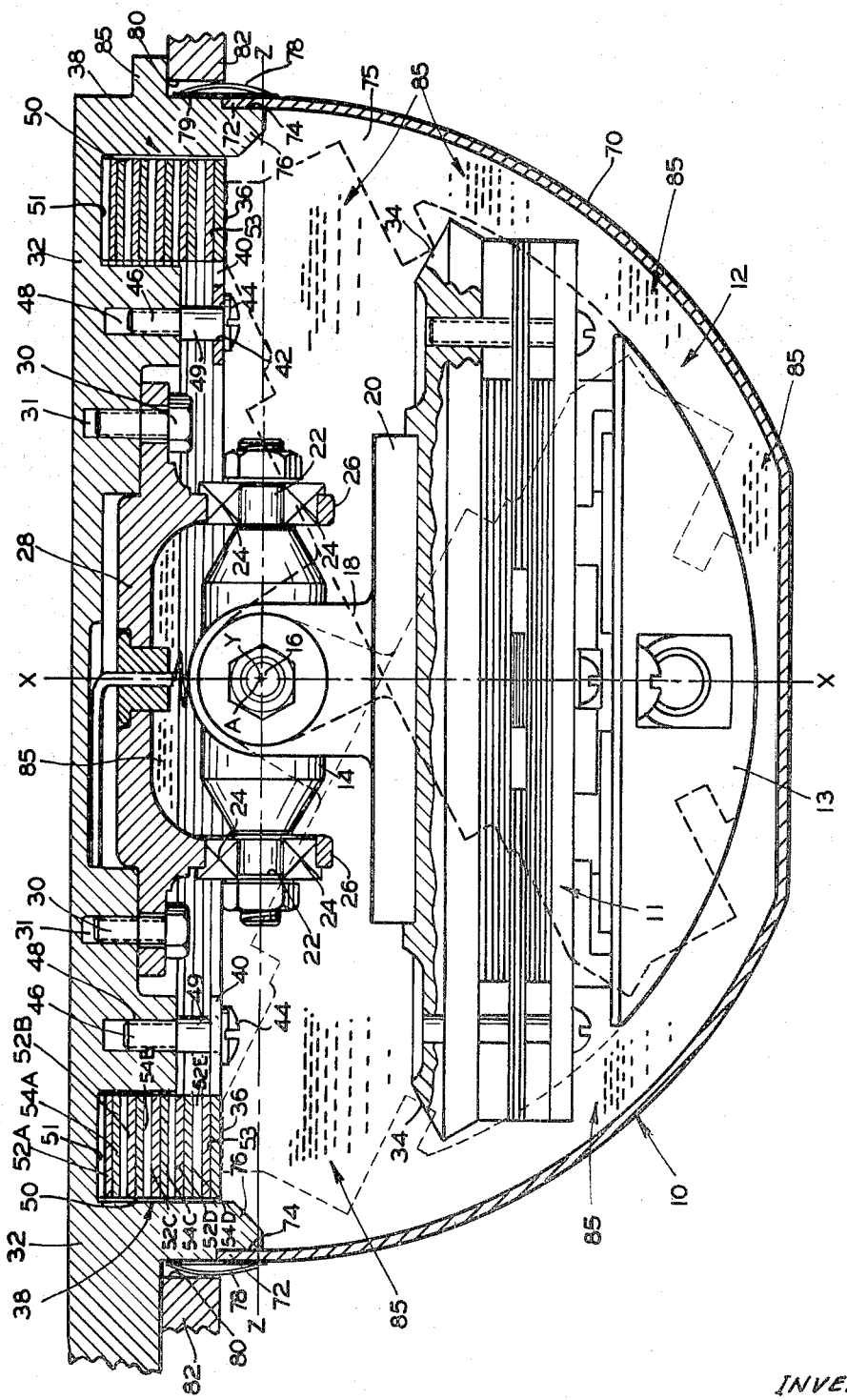
FIG. 1 is an enlarged side view, partly in section, of a free pendulous magnetic azimuth detector mechanism embodying the present invention and including a compact annular self restoring energy absorbing stop shown in section to limit the range of angular movement of the free pendulous mechanism about pitch and bank axes of an aircraft, together with a liquid damping medium in which the detector mechanism is immersed to dampen oscillations thereof, together with the annular stop which provides a low volume, high energy absorbing package.

Referring to the drawing of FIG. 1, there is indicated by the numeral 10 a free pendulous magnetic azimuth detector mechanism for use on an aircraft and which may include a magnetic field sensing element 11 of conventional type positioned perpendicular to the axis X—X which is kept vertical within the limits of travel of an angular bumper surface 34 by a pendulum 12 having a weighted element 13 subject to the forces of gravity.

The pendulum 12 is mounted for oscillation on a gimbal 14 by way of minor trunnions 16 carried by arms 18 projecting from a base plate 20 of the pendulum structure 12. The gimbal 14 is in turn mounted for oscillation on outer trunnions 22 mounted in bearings 24 carried by fixed supporting arms 26 projecting from a mounting plate 28 secured by fastening bolts 30 screw threadedly engaged in suitable fastening holes 31 provided in a base plate 32 of the detector mechanism 10.

The pendulum structure 12 having the vertical axis X—X, as shown in FIG. 1, is mounted for oscillation about two mutually perpendicular horizontal axes, one of which Y—Y is defined by trunnions 16 normally arranged tranversely with respect to the aircraft and the other of which axes Z—Z is defined by trunnions 22 arranged parallel with the fore and aft axis of the aircraft. The inner trunnions 16 may be, therefore, referred to as the pitch axis and the outer trunnions 22 as the bank axis of the aircraft.

Under normal flight conditions, the pendulous magnetic detector mechanism 10 serves its function in conventional manner, compensates for pitch and bank conditions of the aircraft and may include suitable electrical signal transmitting means (not shown). The magnetic field sensing element 11 may be of conventional type including for example a three legged core and coil assembly (not shown) of a type well known in the art for sensing in a level position of the sensing element 11 the magnetic field of the earth and to transmit electrical signals corresponding to the difference in the heading of the aircraft from a prealigned magnetic north. Thus there is transmitted electrical signals corresponding to the detected magnetic azimuth condition of the aircraft in flight in relation to the magnetic field of the earth.

Furthermore, there is provided at an outer upper annular edge surface of the pendulum structure 12 the angular bumper surface 34 extending around the structure 12 and so arranged that upon angular movement of the structure 12 about the pitch axis Y—Y or about the bank axis Z—Z in excess of a predetermined range of for example 30° from the normal vertical position shown by FIG. 1, the bumper surface 34 of the pendulum structure 12 will contact the retainer bumper plate 36 of a self-restoring energy absorbing stop, indicated generally by the numeral 38, which serves to limit the range of angular motion of the pendulum structure 12 of the free pendulous mechanism 10, as indicated by the dash lines of FIG 1, about the pitch axis Y—Y, as well as about the bank axis Z—Z in like manner, as hereinafter explained.

SELF-RESTORING ENERGY ABSORBING STOP

Figures 2, 3:
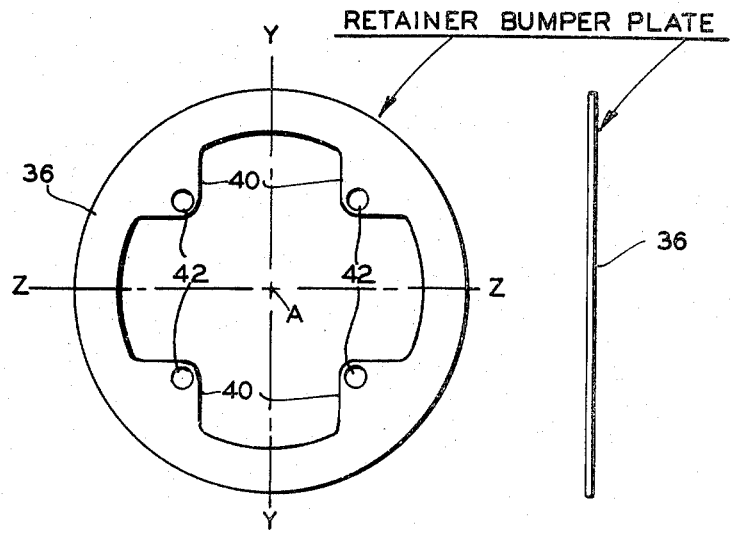
FIG. 2 is a top plan view of the annular shaped flat bumper spring retainer plate of the energy absorbing stop illustrated in the enlarged sectional view of FIG. 1.
FIG. 3 is an edge view of the flat bumper retainer plate of FIG. 2.

In the form of the invention illustrated in FIG. 1, the energy absorbing stop 38, includes as shown in FIGS. 2 and 3, an annular flat retainer bumper plate 36 arranged in the detector mechanism assembly 10 in concentric relation to a point A at which the vertical axis X—X, the pitch axis Y—Y and the bank axis Z—Z intersect, as indicated by FIGS. 1, 2, 4 and 6.

The retainer bumper plate 36, as shown by FIGS. 1 and 2, includes inner projecting ear portions 40 in each of which are positioned an annular opening 42. The annular openings 42 are so arranged as to receive mounting bolts 44, as shown in FIG. 1, positioned in equal distanced spaced relation to the axis Z—Z and Y—Y, as shown by FIG. 2. Each of the mounting bolts 44 have end portions 46 screw threadedly engaged in openings 48 formed in the base plate 32 of the mechanism 10 and stem portions 49 on which the retainer bumper plate 36 is slidably mounted, as shown by the enlarged view of FIG. 1.

Further there is provided in the base plate 32 an annular channel 50 arranged in concentric relation with the point A and including therein and between an inner bottom surface 51 of the channel 50 and an inner surface 53 of the retainer plate 36 a series of annular wavy and flat washer springs 52 and 54 in an alternate stacked relation.

Thus there is provided an annular wavy washer spring 52A bearing at one side on the inner bottom surface 51 of the channel 50 while the opposite side of the wavy washer spring 52A bears upon an adjacent surface of an annular flat washer spring 54A, followed in turn by another wavy washer spring 52B and a flat washer spring 54B; a wavy washer spring 52C and a flat washer spring 54C; a wavy washer spring 52D and a flat washer spring 54D and finally positioned adjacent the inner surface of the annular retainer bumper plate 36 and intermediate the flat washer plate 54D is an annular wavy washer spring 52E.

Figures 4, 5:
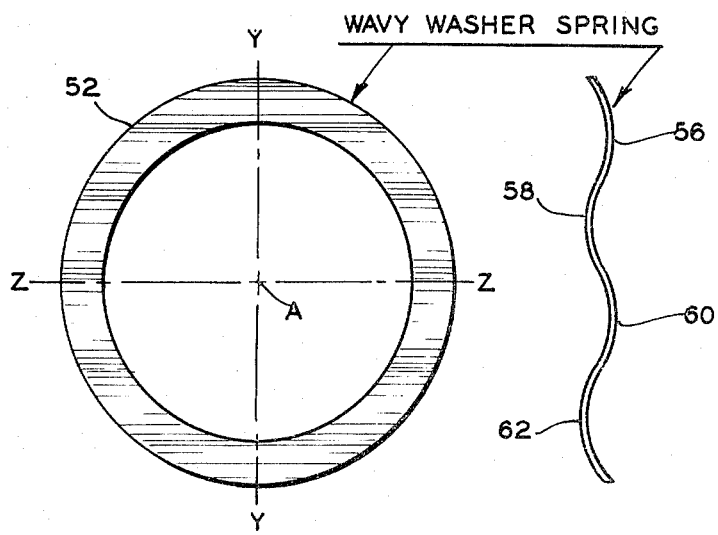
FIG. 4 is a top plan view of the annular wavy washer spring of the energy absorbing stop illustrated in the enlarged sectional view of FIG. 1.
FIG. 5 is an edge view of the wavy washer spring of FIG. 4.

The annular wavy washer springs 52A, 52B, 52C, 52D and 52E may be of the type indicated by the numeral 52 in FIG. 4. Each of the annular wavy spring washers 52, include curves or bends 56, 58, 60 and 62 and are formed of a suitable spring metal material such as beryl sheet copper.

Figures 6, 7:
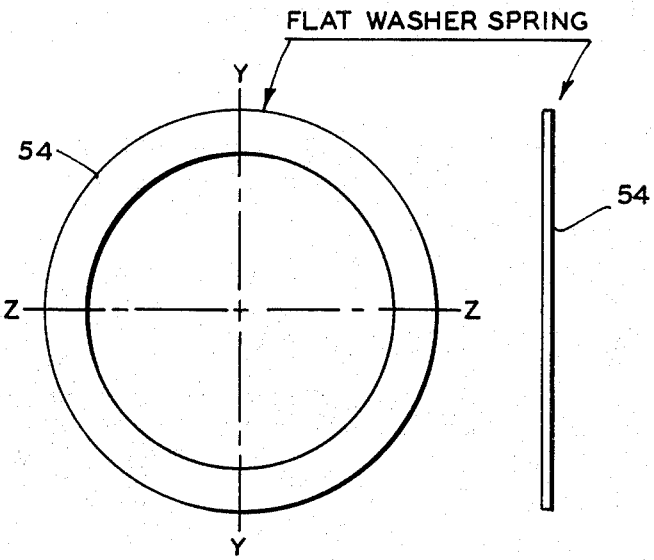
FIG. 6 is a top plan view of the annular flat washer spring of the energy absorbing stop illustrated in the enlarged sectional view of FIG. 1.
FIG. 7 is an edge view of the flat washer spring of FIG. 6.

The annular flat washer springs 54A, 54B, 54C and 54D may be of a type indicated by the numeral 54 in FIGS. 6 and 7. The annular flat washer springs 54 are also formed of a suitable spring metal material such as beryl sheet copper.

The annular self-restoring energy absorbing stop 38, as shown in FIG. 1, thus includes a sandwich of annular flat and wavy washer springs 52 and 54 which are bottomed on the inner bottom surface 51 of the annular channel 50 formed in the end plate 32. The respective spring washers of the energy absorbing stop 38 surround in concentric relation the supporting plate 28 from which project the arms 26 carrying the bank trunnions 22. The bank trunnions 22 project from the gimbal 14 and in turn support the gimbal 14, while the pitch trunnions 16 project from the gimbal 14 perpendicular to the bank trunnions 22 and support the arms 18 projecting from the base plate 20 of the pendulum structure 12.

Surrounding the pendulum structure 12 and arranged in space relation thereto is an inner surface of a dome shaped cap 70 having an annular end portion 72 received in sealing relation in a recess portion 74 formed in an annular flange 76 projecting from the base plate 32. An annular spring element 78 is suitably affixed by a ring plate 79 adjacent an outer surface of the annular end portion 72 of the dome cap 70 and an outer surface of the annular flange 76 and serves to resiliently secure the detector mechanism 10 in operative relation in an opening 80 formed in a structural part 82 of the aircraft, while the base plate 32 and a flange 85 projecting therefrom rests on an upper surface of the structural part 82 of the aircraft so that the azimuth detector mechanism 10 is operatively arranged for use during flight of the aircraft.

Further, the dome shaped cap 70 is filled with a viscous damping liquid 85 which is sealed therein by the base plate 32. The annular end portion 72 of the cap 70 is fastened in sealing relation in the recess portions 74 of the annular flange 76 which project from the base plate 32.

The damping liquid 85 which thus fills the dome shaped cap 70 serves to dampen oscillation of the sensor 11 and pendulum structure 12 within the dome shaped cap 70 and further provides an integral damping action on the sandwich of annular wavy and flat spring washers 52 and 54 bottomed within the annular channel 50 formed in the base plate 32. The retainer bumper plate 36 is slidably mounted on the stem portions 49 of the mounting bolts 44 so that the energy absorbing stop 38 provides a compact package having a displacement volume corresponding to that of the sandwich of spring washers 52 and 54. This energy absorbing assembly 38 of the annular wavy and flat spring washers 52 and 54 is immersed in the damping liquid which fills the dome shaped cap 70.

The arrangement is such that upon the energy absorbing package 38 being compressed upon an impact or steady force being applied to the retainer bumper plate 36 by the bumper surface 34 bearing thereon upon an angular movement of the pendulum structure 12 in excess of the permissable range, the annular wavy spring washers 52 are compressed and straightened between the inner surface of the retainer bumper plate 36, the side surfaces of the annular flat spring washers 54 and the inner bottom surface of the annular channel 50 in the base plate 32 so that the damping liquid 85 in which the assembly 38 is immersed is forced out from between the aforenoted adjacent surfaces and the annular wavy spring washers 52.

In this connection, it should be noted that the inner side surface of the flange 76 is slightly spaced from the outer edge surfaces of the annular spring washers 52 and 54, while the inner side surfaces of the annular channel 50 are slightly spaced from the outer and inner edge surfaces of those of the annular flat and wavy spring washers positioned therein so as to effect a controlled restriction or obstruction to the passage of the viscous damping liquid therethrough upon the damping liquid being squeezed out from between the aforenoted adjacent side surfaces and the annular wavy spring washers 52 and the flat spring washers 54. The controlled restriction or obstruction to the passage of the damping fluid will vary, of course, with the position of the several wavy and flat spring washers 52 and 54 in the annular channel 50 upon the impact or steady force being applied thereto through the retainer bumper plate 36 which is slidably mounted on the stem portions 49 of the mounting bolts 44.

The passage or squeezing of the damping liquid from between the aforenoted surfaces and the annular wavy and flat spring washers 52 and 54 provides a damping action which may be also effectively controlled by the selection of the wetted surface area of the respective annular spring washers and by the viscosity of the damping liquid, as well as by the controlled restriction or obstruction provided to the passage of the damping liquid from between the wavy and flat annular spring washers 52 and 54.

However, upon the applied force being removed the energy absorbing spring assembly 38 is self-restoring to its original position and shape through the spring action of the respective annular wavy spring washers 52 and the flat annular spring washers 54 so that the damping liquid 85 carried by the dome shaped cover 70, and in which the energy absorbing stop 38 is immersed, is effective to cause the surrounding damping liquid to be drawn in between the annular wavy and flat spring washers to fill the void between the respective spring washers 52 and 54 caused by the restoring action thereof.

The restoring action of the energy absorbing stop 38 in drawing the surrounding damping liquid 85 into fill the void between the respective annular spring washers 52 and 54 is effected at a rapid rate and in such a manner as to allow an immediate reapplication of the impacting force to be applied to the retainer bumper plate 36, while preserving all of the original damping effect that is available by the damping fluid 85 being drawn back in between the respective wavy spring washers 52 and the inner and bottom surfaces of the channel 50, the inner side surface of the bumper plate 36 and the adjacent side surfaces of the flat washer spring 54. Relatively high frequency recoverability is then obtainable depending on the particular configuration of the self-restoring energy absorbing stop 38 and its associated relationship in the channel 50.

MODIFIED FORM OF SELF-RESTORING ENERGY ABSORBING STOP

The energy absorbing stop assembly embodying the present invention is a sandwich of flat and wavy spring members, the whole of which is immersed in a damping fluid medium. The dimensions of the respective spring members may be so selected as to obtain a predetermined spring rate and damping force.

Moreover, the outline configuration of the stop assembly may be changed depending on the use to which it is to be applied. Thus a curved package or a round package of annular wavy and flat spring washers, as shown in FIG. 1, may be provided for use in a free pendulous magnetic azimuth detector mechanism indicated by the numeral 10.

Figure 8:
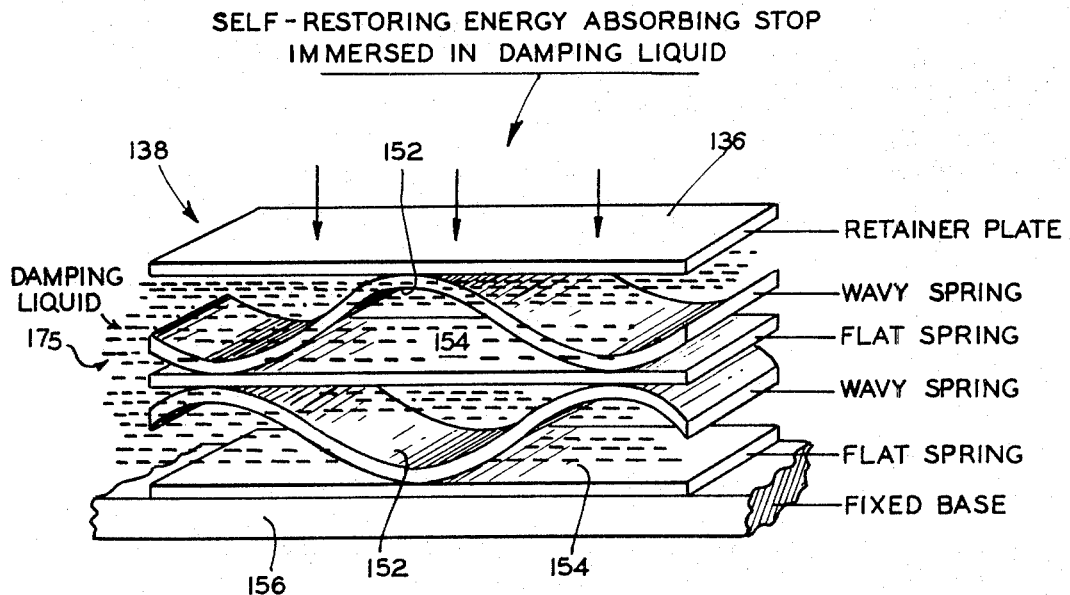
FIG. 8 is an enlarged fragmentary side view of a modified form of the invention as applied to a rectangular energy absorbing assembly including a sandwich type package of flat and wavy spring members with the entire spring assembly being shown immersed in a damping liquid medium.

Moreover in a modified form of the invention, shown by FIG. 8, there may be provided a rectangular package 138 including a sandwich type assembly of flat and wavy spring members. Thus there may be provided a flat rectangular retainer plate 136, and a rectangular wavy spring member 152 having predetermined curves or bends provided therein and formed of a suitable spring metal material. The wavy spring member 152 is positioned between one side surface of the retainer plate 136 and an adjacent side surface of a rectangular flat spring member 154 formed of a similar suitable spring metal; a second rectangular wavy spring member 152 having similar curves or bends provided therein may be positioned adjacent an opposite side surface of the flat spring member 154 and bearing on a surface of a second rectangular flat spring member 154 formed of a similar suitable spring metal material. The last mentioned rectangular flat spring member 154 may bear upon an adjacent surface of a fixed base 156.

The whole of the spring assembly 138 is immersed in a suitable damping fluid or viscous liquid 175. The energy absorbing package 138 may be compressed under impact or upon a steady force being applied to the retainer plate 136, as indicated by the arrows in FIG. 8. The wavy rectangular spring members 152 are then compressed under the applied force and the curves or bends therein straightened between the flat rectangular spring members 154, whereupon the damping liquid 175 in which the energy absorbing package 138 is immersed is forced out from between the adjacent surface of the retainer plate 136 and the adjacent surfaces of the rectangular wavy and flat spring members 152 and 154.

The damping liquid 175 being thereupon forced or squeezed from between the surface of the retainer plate 136 and the surfaces of the spring assembly members 152 and 154 provides a damping action which may be controlled, as heretofore noted with respect to FIG. 8, by selection of the adjacent wetted surface areas of the rectangular retainer plate 136, and the respective surface areas of the spring members 152 and 154, as well as by varying the viscosity of the liquid damping medium 175 and the obstruction or restriction to the passage of the damping liquid from between the wavy rectangular spring members 152 and the flat rectangular spring members 154, as heretofore explained with reference to FIG. 1. Suitable means, not shown, are provided for retaining the viscous damping liquid medium 175 in surrounding relation to the immersed spring assembly 138.

As the force applied to the retainer plate 136, as indicated by the arrows, is removed the spring assembly 138 is effectively self-restoring to its original position and shape by the spring action of the respective wavy and flat spring members 152 and 154 which will effect in turn a drawing of the surrounding damping liquid 175 into fill the void between the respective spring members 152 and 154.

The fast rate of recoverability obtainable by this device then allows an immediate reapplication of the impacting force, indicated by the arrows in FIG. 8, while the damping fluid drawn in to fill the void between the respective spring members 152 and 154 acts to preserve all of the original damping that is available in the system. Relatively high frequency recoverability is then obtained depending on the configuration of the spring arrangement, as heretofore explained with reference to the form of the invention of FIG. 1.

In both forms of the compact assemblage of the self-restoring energy absorbing stop 38 and 138 the following common features are evident; (1) a compact high energy absorbing stop assemblage is disclosed which is effective for providing both a spring and damper assembly; (2) a compact high energy self-restoring stop assembly is provided having an immediate self-restoring capability under high frequency impact; and (3) a compact self-restoring energy absorbing stop is provided which is subject to great flexibility of design in obtaining numerous force damping combinations.

The action of the cushioning device disclosed in the Olson U.S. Pat. No. 2,551,505 may be likened to the striking of a blow with a hammer to any resilient spring. The spring compresses and then rebounds the hammer. In distinction, the viscous damping in the device of the present invention may be likened to a shock absorber where an impact force is dissipated in viscous friction of moving fluid with little or no reaction.

In the case of the freely swinging pendulum stop employed here a rapid back and forth motion of the housing (vibratory input) causes the pendulum to strike the case in an oscillatory manner and it is readily seen that unless the pendulum impact energy is somehow damped, as well as limited, it will verily destroy itself. The cushioning device in the Olson U.S. Pat. No. 2,551,505 would not accomplish this whereas the shock absorbing stop of the present invention does.

Moreover in the present invention the shock absorbing stop is capable of very high damping rates combined with small spring rates which allows extremely high energy absorption by changing the kenetic energy of impact into viscous frictional energy loss to the fluid medium. The device of the Olson U.S. Pat. No. 2,551,505 on the other hand stores the energy of impact by deflecting the metal and rubber components and then returns a large percentage of the stored spring energy into a reverse motion of the impacting object.

What is claimed is:

1. A self-restoring energy absorbing stop comprising a sandwich type spring assembly including spring members having surface areas with predetermined bends in portions thereof, and other members having surface areas upon which the bends in the spring members may bear so as maintain the spring members and the other members in an initial variable spaced relation, a viscous damping fluid medium, the spring assembly being immersed at least in part in the fluid medium, retaining means for maintaining the fluid medium in a surrounding relation to said immersed part of the assembly so as to incorporate to a variable extend damping fluid medium in spaces between the surface areas of said members of the spring assembly, whereby upon a compressive force being applied to the spring assembly the viscous damping fluid medium may be forced out from between said members upon a resultant decrease in area of said spaces and into the damping fluid medium maintained in the surrounding relation to the immersed part of the spring assembly so as to effectively dampen movement of said members under the applied compressive force, while upon removal of the compressive force the spring members effectively restore the members of the spring assembly to the initial variable spaced relation causing viscous damping fluid medium to be drawn in between said members upon a resultant increase in area of said spaces and from the damping fluid maintained in the surrounding relation to the immersed part of the spring assembly so as to recondition the spring assembly for the effective damping of movement of the spring assembly by the viscous fluid medium, a base member having a channel provided therein, the spring members and the other members being positioned in alternate relation in the channel in the base member, the channel having side surfaces spaced from edges of the spring and other members so as to provide a restriction to passage of the damping fluid forced out from between the members upon the resultant decrease in the area of said spaces upon the compressive force being applied to the spring assembly.

2. The self-restoring energy absorbing stop defined by claim 1 in which the spring members include annular wavy washer springs, and the other members include annular flat washer springs, the base member having an annular channel provided therein, and the annular wavy and flat washer springs being concentrically positioned in alternate relation in the annular channel of the base member in said initial variable spaced relation.

3. The self-restoring energy absorbing stop defined by claim 2 in which the annular channel provided in the base member has side surfaces spaced from edges of the annular washer springs so as to provide a restriction to passage of the viscous damping fluid forced out from spaces between surface areas of said washer springs upon a compressive force being applied to said spring assembly causing a resultant decrease in said spaced relation between the washer springs.

* * * * *